United States Patent [19]

Green et al.

[11] 4,388,578

[45] Jun. 14, 1983

[54] POWER FACTOR CONTROLLER

[75] Inventors: Dan Green, Cranford, N.J.; Sandor Goldner, Brooklyn, N.Y.

[73] Assignee: Cynex Manufacturing Corporation, Hillside, N.J.

[21] Appl. No.: 166,046

[22] Filed: Jul. 7, 1980

[51] Int. Cl.$^3$ ............................................. H02P 5/40
[52] U.S. Cl. .................................... 318/729; 318/778
[58] Field of Search ............... 318/729, 810, 798, 778, 318/779

[56] References Cited

U.S. PATENT DOCUMENTS

| | | | |
|---|---|---|---|
| 3,525,916 | 8/1970 | Chodash | 318/341 |
| 4,052,648 | 10/1977 | Nola | 318/805 |
| 4,063,146 | 12/1977 | Oliver | 318/332 |
| 4,176,307 | 11/1979 | Parker | 318/798 |
| 4,190,793 | 2/1980 | Parker et al. | 318/800 |
| 4,249,120 | 3/1981 | Earle | 318/729 |
| 4,266,177 | 5/1981 | Nola | 318/810 |

OTHER PUBLICATIONS

"Power Factor Controller", Brief No. MFS-23280, NASA Technology Utilization Office, Mar. 79.
"Energy Savings in an Induction Motor Using the 8022 Microcontroller", ITEL, Application Note AP-94, May 1980.
Marshall Space Flight Center, "Fast Response Power Saver for Induction Motors", NASA Tech. Briefs, Spring-1979.

*Primary Examiner*—David Smith, Jr.
*Attorney, Agent, or Firm*—Goodman & Teitelbaum

[57] ABSTRACT

A power factor controller for an AC induction motor which controls the input power to the motor commensurate with the loading on the motor so as to improve efficiency. The circuit provides a signal representative of the phase difference between the current through the motor and the voltage across it. The phase difference varies with motor loading and accordingly is utilized to control the input power to the motor. The improvement in efficiency is displayed in terms of the percent savings provided by the controller. The circuit provides an immediate response to initial energization of the motor to enable the motor to reach full speed in minimum time.

19 Claims, 27 Drawing Figures

FIG. I

POWER FACTOR CONTROLLER

BACKGROUND OF THE INVENTION

This invention relates to motor controls, and more particularly to a power factor controller which provides input power to a motor commensurate with the loading on the motor.

An AC induction motor is one that is commonly utilized for numerous appliances and machinery. It generally runs at a constant speed which is independent of both load and applied voltage. However, it is an inefficient motor in that it cannot adjust the amount of current it draws in proportion to its loading. Thus, whether the motor is loaded or unloaded, essentially the same current is drawn so that the motor efficiency goes down when the load decreases.

In order to improve the situation, there has been provided a power factor control system for AC induction motors described in U.S. Pat. No. 4,052,648. This system samples line voltage and current through the motor and decreases power input to the motor proportional to the detected phase displacement between the current and voltage to thereby provide less power to the motor, as it is less loaded.

While the aforementioned power factor control system has provided improved efficiency to an AC induction motor, it does not provide any indication of such efficiency and accordingly the user is unaware of whether the system is effective in providing improvement. In many cases the user can vary the load on the motor in order to optimize the improvement. However, being unaware of the improvement being provided by the control system he cannot adjust the load accordingly.

An additional difficulty with the aforementioned circuit occurs in connection with starting up the motor. Since the motor is controlled only through the control system, when the motor is initially started, it is necessary to simultaneously commence operation of the power factor control system. Accordingly, the motor will only receive power as directed by the control system. As a result, when the motor is initially energized, the power factor control system will delay the ability of the motor to reach full speed.

Additional difficulties with the aforementioned control circuit concern the necessity for numerous components including various amplifiers, and other parts which increase the cost of the control system, as well as the complexity thereof.

Accordingly, there is need for improving the aforementioned power factor control system in order to eliminate these and other problems and provide an improved power factor controller.

SUMMARY OF THE INVENTION

Accordingly, it is an object of the present invention to provide a power factor controller which avoids the aforementioned problems of prior art devices.

Another object of the present invention is to provide an analog power factor controller which improves over the aforementioned prior art controller.

A further object of the present invention is to provide a digital power factor controller for use with AC induction motors.

Still another object of the present invention is to provide a power factor controller which enables the motor to reach full speed in minimum time regardless of whether the motor is switched together with the circuit or separately.

Yet another object of the present invention is to provide a power factor controller which provides a display of the improvement efficiency of an AC induction motor being controlled.

A further object of the present invention is to provide a power factor controller having an improved and more efficient power supply.

Still a further object of the present invention is to provide a power factor controller which enables full power to be applied to motors having different full load voltage phase lags as well as different no load phase lags.

Briefly, in accordance with the present invention, there is provided a power factor controller for an AC induction motor which includes a control device which can be electrically connected in series with each phase winding of an AC motor for thereby controlling the power being sent to the winding. A circuit is coupled to the control device for providing an output that varies in accordance with the difference of phase between the current through the winding and the voltage across the winding. This phase difference varies with the loading on the motor. The output from the circuit is provided to the control device for varying the duration of the "on" time of each cycle of input power to the winding in accordance with the phase difference to thereby provide input power to the motor commensurate with the loading on the motor so as to improve efficiency.

In an embodiment of the invention there is provided a display coupled to the circuit for displaying the improvement in efficiency. Specifically, an LED display is included which provides an output display indicating the percent savings produced by the power factor controller.

Also, in accordance with the invention there is provided a start up circuit which responds to the initial energization of the motor for maintaining the "on" time of the control device at maximum in order to enable the motor to reach full speed in minimum time.

One embodiment of the invention describes an analog power factor controller system while another embodiment describes a digital power factor controller system. There is also described an improved power supply for use with the power factor controller as well as a circuit for enabling full power to be applied to motors having different full load phase lags as well as different no load phase lags.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENTS

Figure 1:
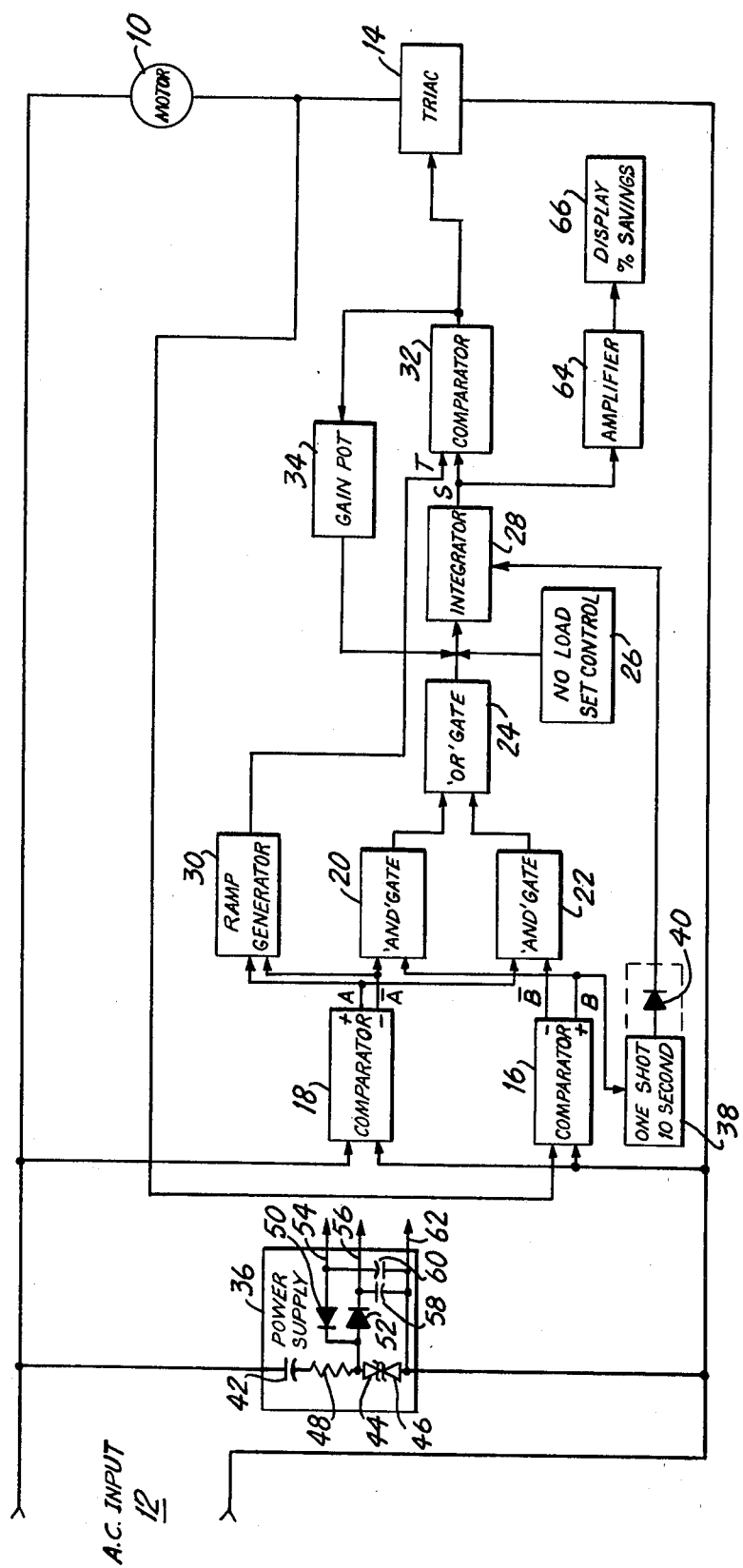
FIG. 1 is a block diagram showing an analog power factor controller system in accordance with the present invention.

Referring now to FIG. 1, there is shown the improved analog power factor control system which provides more efficient power supply, a gain control, a display in percentage savings, and a circuit to ensure "hard starts," regardless of whether the motor is switched on together with the control circuit or separately.

More specifically, an AC induction motor 10 is powered by means of an alternating voltage applied at the AC input 12. The input power passes to the motor under control of a triac 14 connected in series with the motor. The traic is triggered for controlled portions of each half cycle of power input to regulate the amount of power being sent to the motor.

When the motor is initially turned on, comparator 16 begins to sense the presence of line voltage across the triac 14. Comparator 18, connected across the AC input, senses the input line voltage. The output of comparator 16 is two squares waves which represent the motor current as well as its inversion. The output of comparator 18 provides two square waves representing the line voltage and its inversion.

The outputs of the two comparators 16, 18 are applied to the inputs of AND gates 20 and 22. It should be noted that the positive and negative outputs of the respective comparator are applied to the same AND gate. At the output of each of the AND gates 20 and 22 there is a low level pulse whose width depends on the phase displacement between voltage and current. A similar output occurs from gate 22. The signals from the two gates 20 and 22 are applied to the inputs of OR gate 24 which combines them and provides output pulses having a duty cycle equal to the phase displacement between the voltage across the motor winding and the current through the motor winding. The output from OR gate 24 is combined with a small, variable negative voltage from no-load set control 26 which can be a potentiometer providing a voltage level. These two outputs are then sent to the input of the integrator 28.

Integrator 28 provides a negative output voltage which becomes less negative as the load on the motor 10 is increased, and more negative as the load on the motor is reduced. The equilibrium or no-load being set by the control 26 at a value experimentally determined to provide adequate power to the motor to make it run at a constant speed with adequate stability at no-load.

The positive output from the comparator 18 is also sent to a ramp generator 30 which produces a negative polarity saw tooth voltage synchronized with the zero crossing of each half cycle of the line voltage. The output from the ramp generator 30 together with the output from the integrator 28 are sent to a comparator 32. Where the negative output voltage from the integrator intersects the saw tooth signal from the ramp generator, comparator 32 provides a negative output pulse which is applied to the triac 14 to turn it "on" so as to apply power to the motor at that time during each half cycle. The pulses occur from the comparator once per each half cycle.

A portion of the output from generator 32 is returned through gain control potentiometer 34 back to the input of integrator 28 in order to add a small amount of positive feedback in order to increase the stability and therefore the range of the system. This feedback enables full power to be applied to motors having different full load voltage-current phase lags.

When the motor is first turned on, regardless of whether the motor is switched together with the power factor controller circuit or not, the motor will immediately start up to full power. This is referred to as "hard start". Specifically, as the power supply 36 begins providing operating voltages, comparator 16 begins to sense the presence of line voltage across the triac 14. The output from comparator 16, which is a square wave, is applied to the input of one-shot 38. A positive voltage appears at the output of the one-shot for a predetermined amount of time, typically 10 seconds. The output from the one-shot 38 is applied to the integrator 28 so that the output from the integrator goes positive. This positive output voltage from the integrator 28 is applied to the comparator 32. Such positive output voltage from the integrator applied to the input of the comparator 32 swamps the negative polarity saw tooth voltage being applied at the other input to the comparator from the ramp generator 30. As a result, the output of comparator 32 goes fully negative turning on the triac 14 fully and applying full voltage to the motor 10 enabling it to reach full speed promptly. After the initial interval provided by the one-shot 38, the output of the one-shot 38 goes negative and a diode 40, connected in series with the output of the one-shot, disconnects the one-shot from the integrator so that it has no further effect.

The power supply 36 is an improved power supply in that it avoids the need of utilizing transformers and at the same time does not generate as much heat as a resistor type power supply. Specifically, the power supply includes a first capacitor 42 placed in series with diodes 44 and 46 which are in turn connected in back-to-back relationship so that the two negative terminals of the diodes are connected in common. The series circuit connection is then placed in parallel across the AC input 12. A resistor 48 can be included in series between the capacitor 42 and the first diode 44. A second pair of diodes 50, 52 are also provided and connected in series so that the negative terminal of diode 50 is connected to the positive terminal of diode 52. The interconnection between the second pair of diodes 50, 52 is connected to the junction between the capacitor 42 and the diode 48. If a resistor 48 is included, it would be connected to the junction between the resistor 48 and the diode 44. The other end of each of the diodes 50, 52, provides an output of the power supply, specifically on lines 54, 56.

Capacitors 58, 60 respectively connect the output lines 56, 54 with the other end of the diode 46. A ground line 62 is connected to the other end of the diode 46.

With the power supply as shown, the lines 54, 56 can provide the positive and negative output voltages which are utilized in conjunction with the common ground voltage 62. Such power supply utilizes only three capacitors and four diodes and provides improved results eliminating the cost of the transformer and the heat of a resistor power supply.

The output from the integrator 28, which is a negative output voltage whose voltage level varies in accordance with motor loading, is also applied to the input of the amplifier 64 which inverts and scales the signal level in the positive domain. The output of amplifier 64 is then applied to the input of a dot-graph display driver 66, which can be any of the standard circuits providing an LED display in percent savings. As a result, the reading of the display decreases as the load upon the motor is increased. Thus, the input power is generally provided to the motor in such a manner as to provide full loading. For such full loading, the motor is typically operating at its rated efficiency. However, as the loading on the motor is reduced, the power factor controller of the present invention operates so as to provide reduced power to the motor commensurate with the reduced loading. As a result, normally without the power factor controller of the present invention a motor would have reduced efficiency as the loading is reduced. In the present situation, with the present circuit, the efficiency of the motor is improved greater than with motors not having such controller. The display indicates such improved efficiency in percent savings.

It should be appreciated, that some of the details of the wave forms produced by various aspects of the present invention are similar to that heretofore described in the aforementioned U.S. Pat. No. 4,052,648, all of which is hereinincorporated by reference. However, various aspects of the present invention provide improvements in such power factor controller so as to improve the operation thereof, as was hereindescribed.

The power factor controller of the present invention can also be provided in digital format. Specifically, referring now to FIG. 2, there is shown a digital induction motor economizer circuit which operates by sensing the trailing edge of the current waveform of a motor as sensed across a triac and thereby controls the delay of a firing pulse to the triac in proportion to the phase displacement between the trialing edge of the current waveform and the line voltage waveform. Such phase displacement varies as the load on the motor varies. In this way, by making the voltage across the motor and therefore its power consumption more closely proportional to the load on the motor, the power factor of the motor is kept constantly high regardless of the load. As a result, large power savings are effected at reduced load so that electric utility savings are brought about.

Additionally, the circuit reduces motor temperature and as a result provides for extended life of the motor. It also eliminates the need for power factor correction capacitors which are typically utilized with induction motors.

Figure 2:
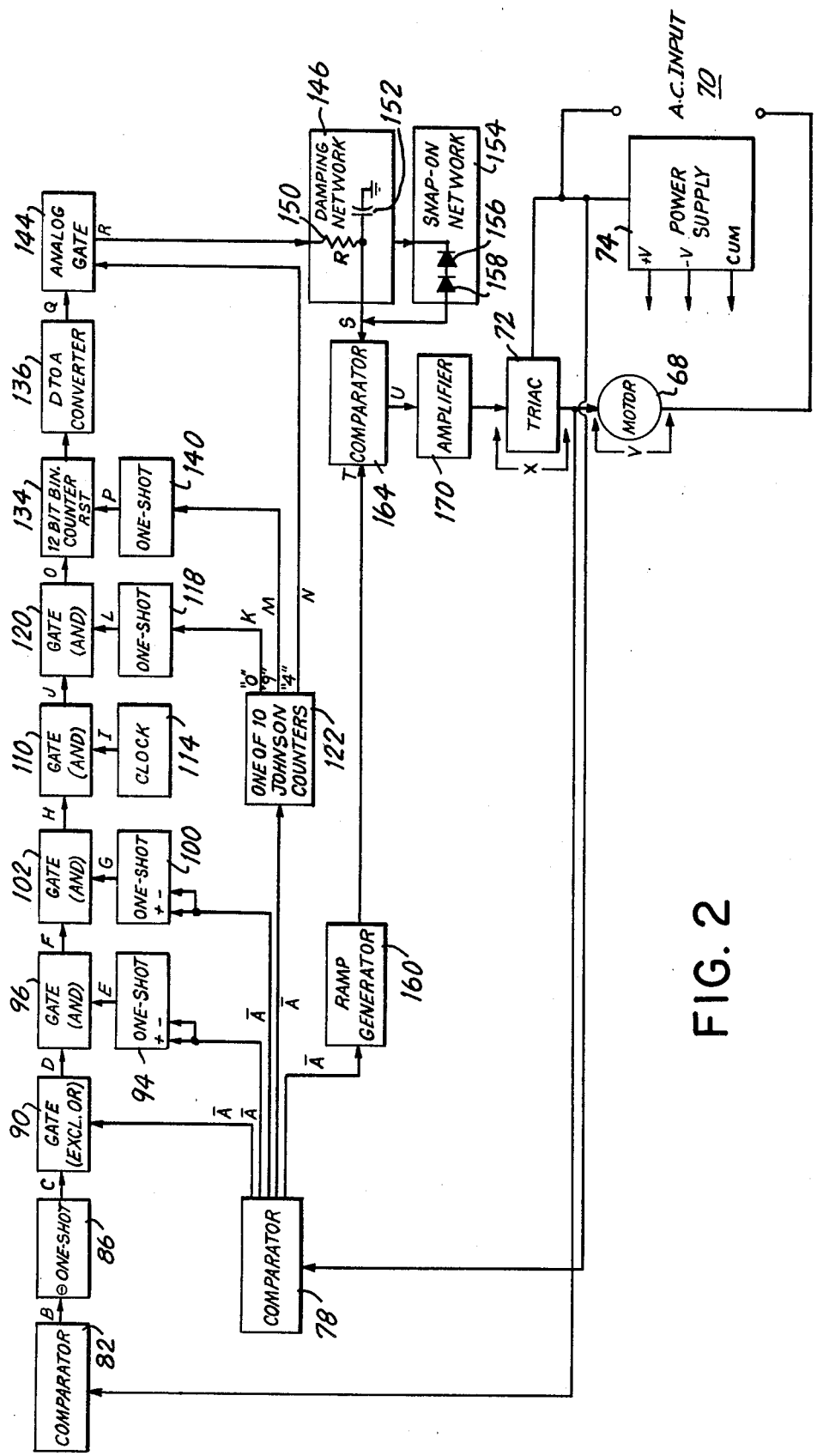
FIG. 2 is a block diagram showing a digital power factor controller system in accordance with the present invention.

Referring now to FIG. 2, there is shown an AC induction motor 68 which is powered by an alternating current power source provided at the AC input 70. A triac 72 is connected in series with the motor so as to control the power flow into the motor. The triac is triggered for controlled portions of each half cycle of power input to as to thereby adjust the power flowing into the motor. A power supply 74 is connected across the AC input 70 in order to energize the various components of the power factor controller circuit to be hereinafter described. The power supply can be of the type previously described in connection with FIG. 1.

When the motor 68 is turned on, the line voltage 76, as shown in FIG. 3A, is applied to the system and is sensed by the comparator 78 which produces an inverted square wave output 80, shown in FIG. 3A. The zero crossing of the square wave 80 is commensurate with the zero crossing of the line voltage 76.

With the motor 68 operating at full speed, the voltage across the triac 72 is applied to the comparator 82 which produces a square wave output 84, shown in FIG. 3B. The square wave output 84 is proportional and in phase with the current flowing through the triac and accordingly through the motor winding.

The output from the comparator 82 is applied to a one-shot 86 in order to produce the square wave pulse form 88 shown in FIG. 3C. The trailing edge of the square wave output from the comparator 82 is utilized to trigger the one-shot 86 so that the positive going pulses of waveform 88 occur once per cycle starting from the trailing edge of the current pulse zero crossing. Typically, the duration of the one-shot pulse is 8mS.

The output waveform 88 from one-shot 86, together with the output 80 of the comparator 78 are applied as inputs to an exclusive OR gate 90. Gate 90 thereby produces a pulse waveform 92, as shown in FIG. 3D, which occurs once per half-cycle and whose width is equal to the phase displacement between the output of one-shot 86 and comparator 78.

The output of gate 90, shown as the waveform 92, together with the output of another one-shot 94, are applied as inputs to an AND gate 96. One-shot 94 provides a ground level pulse at the beginning of each half cycle of the voltage waveform since it is triggered by the waveform 80 from the comparator 78. Typically, one-shot 94 produces a 2mS pulse, shown as waveform 98 in FIG. 3E. This output waveform 98 from the one-shot 94 disables the gate 96 for the duration of the pulse output from one-shot 94 of each half cycle. The output of gate 96 is shown as the waveform 104 in FIG. 3F. This waveform 104 is provided to a further AND gate 102 together with the output waveform 106, shown in FIG. 3G from a further one-shot 100. The one-shot 100 provides a positive gate enabling signal for a fixed duration of each line cycle. Typically, a 4 mS duration signal is provided from one-shot 100.

It has been found that the trailing edge of the current waveform always lags the voltage waveform by a time duration of 2 mS or less at full load and never exceeds 4 mS at no load. The circuits 94, 96, 100 and 102 therefore provide a window or well defined operating limit for these values. Specifically, the output of the AND gate 102 is therefore a pulse which can vary between 2 mS and 4 mS limits defined by these circuits. The pulse width within these limits depends on the phase displacement between the sensed motor current and line voltage.

The output of AND gate 102 is the waveform 108, shown in FIG. 3H. This waveform passes to yet another AND gate 110 which also receives clock signals, shown at 112 in FIG. 3I, from a clock 114. Typically, such clock operates at a frequency of between 2–6 MHz. Accordingly, the output from gate 110 is a burst to clock pulses having a duration of between 0 and 2 mS depending on the phase displacement between the output of the voltage waveform as detected by the comparator 78 and the current waveform, as provided by means of the one-shot 86. Such duration occurring within a 2 mS and 4 mS window as defined above. These pulses will occur once per half cycle, the waveform produced by the gate 110 being shown as the waveform 116 in FIG. 3J.

The ratio of the change of the phase control signal at the triac at the phase lag between the sensed voltage and current waveforms, or effectively the "gain" of the control loop is set by the frequency of the clock.

The output of the gate 110, as shown by the waveform 116, in conjunction with the output of a one-shot 118, is provided to a further AND gate 120. One shot 118 provides a fixed time duration positive pulse each time the "0" output of the 1 of 10 Johnson counter 122 goes positive. The Johnson counter 122 counts the voltage pulses from the comparator 78 and provides a recyclical 10 output count which changes state sequentially once per line cycle. Outputs are taken at the "0" count shown as the waveform 124 in FIG. 3K, an output is taken at the "9" count as shown in the waveform 126 in FIG. 3M and an output at the "4" count shown by the waveform 128 in FIG. 3N. The output of the one-shot 118, is shown in FIG. 3L as 130 and will occur at the leading edge of each one of the "0" counts from the counter 122.

As a result, the bursts from gate 110, shown as the waveform 116, are allowed to pass to the output of AND gate 120 only once every 10 line cycles at the occurrence of the "0" count of counter 122. Such output is shown as the waveform 132 in FIG. 3O. Typically, one-shot 118 is an 8 mS one-shot.

The output from gate 120 is applied to a counter 134, typically a 12 bit binary counter, which increments to a binary count equivalent to the number of pulses present at the output of the gate 120 during the interval provided by the one-shot 118 which occurs during the "0" count of the counter 122. The parallel outputs of the counter 134 are connected to a digital to analog converter 136. The output from the converter 136, is shown as waveform 138 in FIG. 3Q and is a voltage level proportional to the count reached by the counter 134 during the count "0" of counter 122.

The voltage at the output of the digital to analog converter 136 is held for 9 more line cycles. Then, in the trailing edge of the 9th line cycle, a positive pulse is produced by the one-shot 140, in response to the waveform 126, shown in FIG. 3M from the counter 122. The output from one-shot 140 is shown as the waveform 142 in FIG. 3P, and serves to reset the counter 134 preparing it for the next count interval "0" of counter 122. Typically, the one-shot 140 provides a 50 μS positive pulse during this "9" count.

During the "4" count of the counter 122, a positive pulse from the counter is applied to the control terminal of an analog gate 144 which then allows the output from the digital to analog converter 136 to appear at the input of a damping network 146. Typically, the signal applied to the analog gate is shown in FIG. 3N as the waveform 128 and includes a 16 mS pulse. The output from the analog gate 144 is shown as the waveform 148 in FIG. 3R.

Damping network 146 is shown to include a series resistor 150 and a parallel capacitor 152 whose other end is connected to ground. This network smooths the sudden changes appearing at the output from the analog gate 144 thereby preventing rough operation and possible unstable conditions. This stabilizing effect, however, is achieved at the expense of response time which should be no more than about 10 line cycles in the case of a sudden or a clutched in load. To overcome this limitation, a snap on network 154 is provided which includes two back to back diodes 156, 158. This circuit updates the output of the damping network 146 as soon as the downward change, indicating an increasing load, occurs at the output of the analog gate 144 and exceeds the two diode voltage drop.

The waveform 80 shown in FIG. 3A at the output of the comparator 78, which is a square wave representing the line voltage, is applied to a ramp generator 160 which produces a saw tooth waveform synchronized with the zero crossing of each half cycle of the input applied voltage. This waveform, shown in FIG. 3T as waveform 162 is applied to the input T of the comparator 164. The other input S to comparator 164 is the voltage level provided from the damping network 146, and shown as the waveform 166 in FIG. 3S. The output from the comparator 166 is a pulse produced each time the two inputs to the comparator intersect. Such output is shown as the waveform 168 in FIG. 3U. The waveform is amplified by amplifier 170 and then applied to the triac 72 turning it "on" for the remainder of the half cycle. The pulse is repeated once each half cycle insuring that a symmetrical phase controlled voltage is applied to the motor. The voltage across the triac is shown as the waveform 172 in FIG. 3X and indicates that when the waveform 168 applies a pulse turning "on" the triac, the triac remains on for the remainder half cycle. At that time, the voltage inverts across the triac and turns off the triac until it is next triggered "on" by the next pulse from the comparator 164. The motor current waveform is shown at 174 in FIG. 3W and also indicates that motor current will flow during the time that the triac is turned "on".

In order to provide a "hard start" as soon as the motor is turned on, it should be noted that the capacitor 152 in the damping network 160 is initially discharged to zero. As a result, when the motor is first turned on, the waveform 166 shown in FIG. 3S will be at zero voltage and accordingly the waveform 162 shown in FIG. 3T will cause the comparator to produce pulses whose width is commensurate with the full half cycle. As a result, the triac will be turned on at each line voltage zero crossing to thereby provide for the triac being fully "on" so as to apply full voltage to the motor enabling it to reach full speed promptly.

Figure 3:
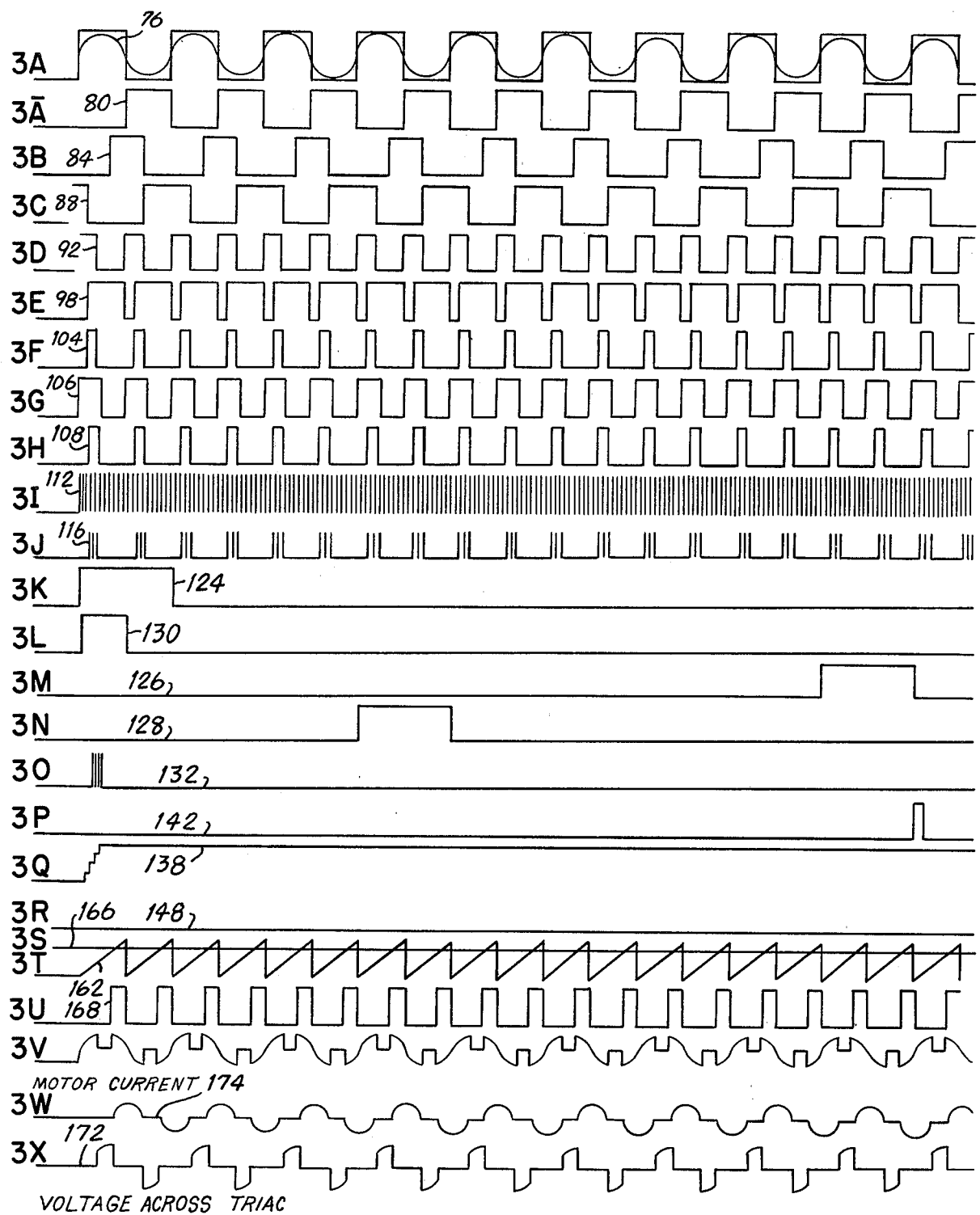
FIGS. 3A–3X are waveforms illustrating aspects of the operation of the circuit shown in FIG. 2.

It should be appreciated that the waveforms shown in FIG. 3 are for no-load condition. As the motor becomes loaded, the phase lag will descresase and accordingly the waveforms will be adjusted so that the triac is turned "on" for a greater portion of each half cycle.

It should be appreciated that the display described in connection with FIG. 1 could also be utilized in connection with the digital power factor control shown in FIG. 2 by applying the output from the damping network to an amplifier and subsequently to a display so as to display the percent savings. It should also be appreciated that the various circuits shown in block form in the figures are ones that are individually well known in the art and can easily be fabricated by means of standard known solid state devices readily available off the shelf. Although the ivention illustrated is shown as being usable with a single phase device, it may be connected in circuit with each phase of a multistage induction motor as well.

Figure 4:
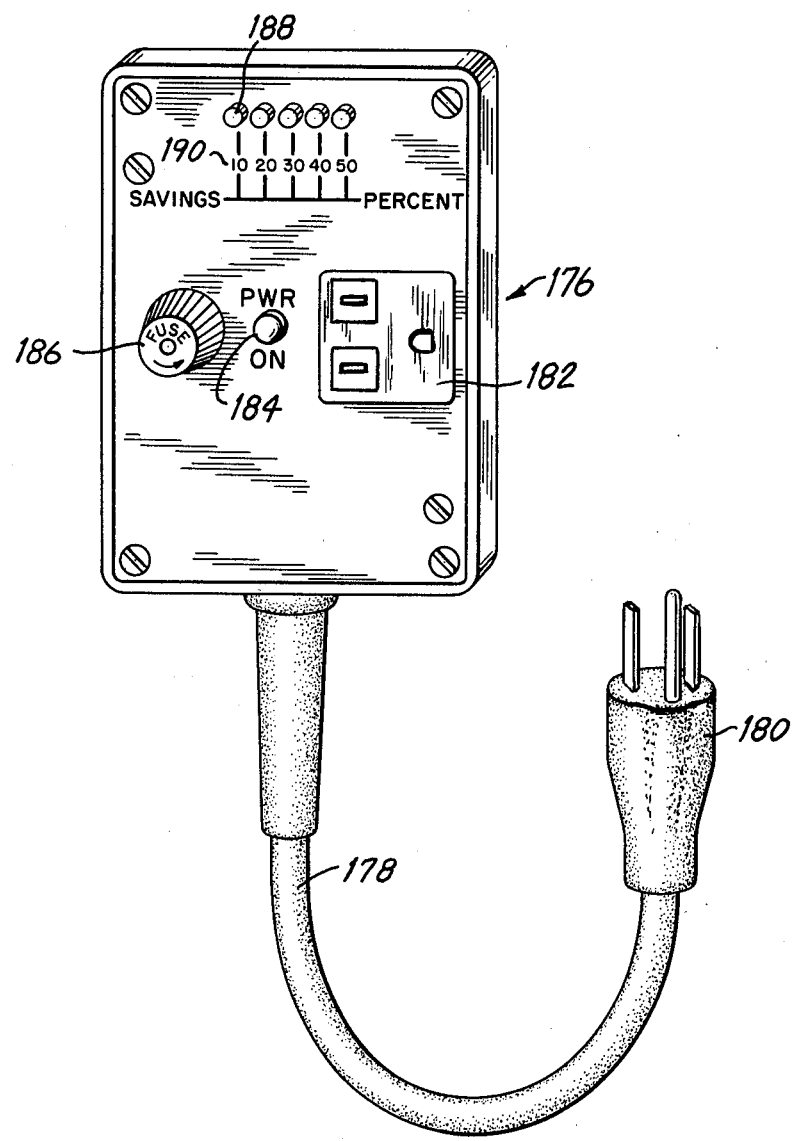
FIG. 4 is an elevational view of a housing comprising the present invention.

Referring now to FIG. 4 there is shown an embodiment of a housing incorporating the power factor control system of the present invention. The housing includes an outer case 176 of substantially rectangular configuration from which extends a wire 178 terminating in an electric plug 180 suitable for insertion into an outlet providing AC voltage.

Contained on the housing is a socket 182 suitable for receiving the plug from an appliance such as a refrigerator, freezer, fan, printing machine, etc. A light indicator 184 is provided to display that the power of the system is on. A fuse 186 can be connected in series with the AC input for protecting against short circuits.

At the upper part of the housing there is provided a series of light emitting devices, such as the LED display 188. Five individual bulbs are included, each of which indicates an additional percent savings. Indicia 190 on the case 176 beneath each bulb indicates incremental savings between 0 and 50%.

When the controller is in operation, it will be plugged into a wall socket and the appliance plugged into the case. As the load varies on the appliance motor the display will indicate the percent savings provided by the power factor controller.

In addition to having a plug-in model as shown, it is possible to have the controller wired-in directly into the appliance. The model could also be provided for 110 volts AC or 220 volts AC, as well as for single phase and three phase motors both of the fractional horsepower motor type as well as motors with horsepowers up to 100 horsepower and posssibly even higher.

There has been disclosed heretofore the best embodiments of the invention presently contemplated. However, it is to be understood that various changes and modifications may be made thereto without departing from the spirit of the invention.

We claim:

1. A power factor controller for an AC induction motor comprising:
   a control means adapted to be electrically connected in series with each phase winding of the AC motor for controlling the power to said winding;
   circuit means coupled to said control means for providing an output which varies in accordance with the difference in phase between the current through said winding and the voltage across said winding, said phase difference varying with motor loading, and for providing said output to said control means for varying the duration of "on" time of each cycle of input power to said winding in accordance with said phase difference to thereby provide input power to the motor commensurate with the loading on the motor so as to improve efficiency,
   start-up means for producing an output signal to said circuit means whereby said circuit means maintains the "on" time of said control means at maximum for a predetermined duration to enable the motor to reach full speed in minimum time, and
   means coupled to said start-up means for causing said start-up means to produce its output signal when said motor is initially energized simultaneously with initial energization of said circuit means as well as for causing said start-up means to produce its output signal when said motor is initially energized after said circuit means have already been energized.

2. A power factor controller as in claim 1, and further comprising display means coupled to said circuit means for providing a display of the improvement in efficiency.

3. A power factor controller as in claim 2, wherein said display means comprises an LED display which provides an output indicating percent savings.

4. A power factor controller as in claim 1, wherein said circuit means comprises a first comparator means for sensing the voltage across said control means and in response thereto providing a square wave output in phase with the current through said winding, a second comparator means for sensing the voltage of the electrical input applied to said winding and providing a square wave output in phase with said voltage across said winding, and gating means for combining said square wave outputs from said first and second comparator means to provide square wave pulses whose duty cycle is equal to said phase displacement.

5. A power factor controller as in claim 4, wherein said circuit means further comprises ramp generator means responsive to said second comparator means output for providing a saw tooth wave synchronized with the zero crossings of each half cycle of said voltage applied to said winding, integrator means receiving the output of said gating means for providing an output voltage level proportional to motor loading, and third comparator means for comparing said saw tooth wave with said output voltage level and producing an output control pulse whose width is determined by the intersections between said saw tooth wave and said output voltage level, said output control pulse being applied to said control means for control of said "on" time thereof.

6. A power factor controller as in claim 5, and further comprising a no-load control coupled to said integrator means for providng a no-load voltage level to the integrator so as to provide adequate power to the motor to make it run at no-load with constant speed and stability.

7. A power factor controller as in claim 5, and further comprising a gain control means interconnected between the output of said third comparator means and the input of said integrator means for providing positive feedback to thereby aid in the provision of full power to the motor at full loading.

8. A power factor controller as in claim 5, wherein said start up means comprises a pulse generating means responsive to the initial output of said first comparator means for providing a single pulse of a preselected duration to said integrator means such that the output of said third comparator means fully turns "on" said control means during said preselected duration to thereby enable the motor to reach full speed promptly, and cut off means for thereafter disconnecting said pulse generating means from said integrator means.

9. A power factor controller as in claim 1, and further comprising a power supply energized by an AC electrical input and providing DC level outputs for energizing said circuit means, said power supply comprising in series circuit combination, a first capacitor and a first pair of diodes coupled in back-to-back relationship, said series circuit combination adapted for connection across said AC input, a second pair of diodes connected in a common direction, the interconnection between said second pair of diodes coupled to the junction between said first capacitor and said first pair of diodes, the other end of each of said second pair of diodes respectively providing an output of said power supply, and a pair of capacitors respectively connecting one of said power supply outputs to the other side of said first pair of diodes.

10. A power factor controller as in claim 4, wherein said first comparator output is in phase with the trailing edge of the current through said winding, and further comprising a time limiting circuit for limiting the time of the occurrence of said square pulses to predetermined operating limits.

11. A power factor controller as in claim 10, wherein the occurrence of said square wave pulses is limited to between 2 mS and 4 mS from the zero crossing of the voltage wave.

12. A power factor controller as in claim 4, and further comprising clock means for providing high frequency clock pulses, counter means for digitally counting the clock pulses occurring during each of said square wave pulses, digital-to-analog means for converting the digital count to an analog voltage level, ramp generator means responsive to said second comparator means output for providing a saw tooth wave synchronized with the zero crossings of each half cycle of said voltage applied to said winding, and third comparator means for comparing said saw tooth wave with said analog voltage level and producing an output control pulse whose width is determined by the intersections between said saw tooth wave and said analog voltage level, said output control pulse being applied to said control means for control of said "on" time thereof.

13. A power factor controller as in claim 12, and further comprising a ring counter for cyclically counting the square wave pulses from said second comparator means and controlling the flow of said clock pulses to said counter means to only specified recurring ones of said square wave pulses, and for resetting said counter means during the other recurring ones of said square wave pulses.

14. A power factor controller as in claim 12, wherein said start up means comprises a damping network interconnected between said digital-to-analog converter and said third comparator means for smoothing the sudden changes appearing at the output of said third converter means during power factor control and for providing no input to said third comparator means during motor start up such that said third comparator means fully turns "on" said control means during start up to thereby enable the motor to reach full speed promptly.

15. A power factor controller as in claim 14, and further comprising a snap-in network coupled to said damping network for quickly adjusting the output of said damping network in the event of large changes in said analog voltage level to thereby improve response time.

16. A power factor controller for an AC induction motor comprising:

control means adapted to be electrically connected in series with each phase winding of the AC motor for controlling the power of said winding;

circuit means including means for detecting the voltage across the winding, means for detecting the current through the winding, means for providing an output which varies in accordance with the difference in phase between the current through said winding and the voltage across said winding, said phase difference varying with motor loading, means for providing a ramp signal corresponding to the voltage sensed, and comparator means for combining the ramp signal with said output and for providing the result of the comparison to said control means for varying the duration of "on" time of each cycle of input power to said winding in accordance with said phase difference to thereby provide input power to the motor commensurate with the loading on the motor so as to improve efficiency, display means, and means coupling said display means to said output for causing said display means to provide a display of the amount by which energy consumption has been reduced at particular loads.

17. A power factor controller as in claim 16, wherein said display means comprises an LED display which provides an output indicating percent savings.

18. A power factor controller as in claim 17, and further comprising housing means containing said control means and said circuit means, a plug electrically extending from said housing means for connection to an AC input, a socket on said housing for receiving the plug from the motor, and wherein said LED display is externally viewable from said housing.

19. A power factor controller as in claim 16, wherein said display means comprises an analog control circuit and a dot-graph display.

* * * * *